United States Patent
Chan et al.

(10) Patent No.: US 8,971,273 B2
(45) Date of Patent: Mar. 3, 2015

(54) DYNAMIC BANDWIDTH SELECTION FOR WIDE BANDWIDTH WIRELESS LOCAL AREA NETWORKS

(71) Applicant: Cisco Technology, Inc., San Jose, CA (US)

(72) Inventors: Douglas Chan, San Jose, CA (US); Mansoor Ahmed, Parker, TX (US); Ahmadreza Hedayat, Allen, TX (US); Brian D. Hart, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 213 days.

(21) Appl. No.: 13/647,517

(22) Filed: Oct. 9, 2012

(65) Prior Publication Data

US 2014/0098748 A1    Apr. 10, 2014

(51) Int. Cl.
*H04W 4/00* (2009.01)
(52) U.S. Cl.
USPC .......................................... 370/329
(58) Field of Classification Search
USPC ......... 370/203, 204–215, 229–240, 310–337, 370/338–350, 351–394, 395.1, 395.3, 370/395.4, 395.41, 395.42, 395.5, 395.52, 370/431–457, 458–463, 464–497, 498–522, 370/523–520, 521–529
See application file for complete search history.

(56) References Cited

U.S. PATENT DOCUMENTS

| 6,829,486 | B2 | 12/2004 | McKenna et al. |
| 7,075,906 | B2 | 7/2006 | Douglas et al. |
| 7,197,013 | B2 | 3/2007 | Douglas et al. |
| 7,280,607 | B2 | 10/2007 | McCorkle et al. |
| 7,363,008 | B2 | 4/2008 | Hassan et al. |
| 7,372,866 | B2 | 5/2008 | Jang et al. |
| 7,558,592 | B2 | 7/2009 | Hart et al. |
| 7,573,857 | B1 | 8/2009 | Radhakrishnan et al. |
| 7,593,356 | B1 | 9/2009 | Friday et al. |
| 8,155,482 | B2 | 4/2012 | Chan et al. |
| 2003/0054827 | A1 | 3/2003 | Schmidl et al. |

(Continued)

FOREIGN PATENT DOCUMENTS

| WO | 2006045097 A2 | 4/2006 |
| WO | 2006069176 A2 | 6/2006 |
| WO | 2006045097 A3 | 8/2006 |

OTHER PUBLICATIONS

KNECKT, "Overlapping BSS Co-Existence," IEEE 802.11-10/1303r6, Nov. 11, 2010, pp. 1-19.

(Continued)

*Primary Examiner* — Jung-Jen Liu
(74) *Attorney, Agent, or Firm* — Edell, Shapiro & Finnan, LLC (57) ABSTRACT

Dynamic bandwidth selection techniques are provided for a plurality of wireless access point devices that operate in a wireless local area network. Each access point device is capable of serving wireless client devices with a bandwidth from a set of possible bandwidths associated with one or multiple contiguous or non-contiguous radio frequency channels. A bias is generated based on determined type of traffic or client composition for each access point device, the bias favoring a channel assignment that results in a particular bandwidth in the set of bandwidths. The bias is applied to metrics representing severity and degree of interference for each channel to generate adjusted metrics. A bandwidth from the set of possible bandwidths is selected for each access point device based on the adjusted metrics.

24 Claims, 9 Drawing Sheets

(56) References Cited

U.S. PATENT DOCUMENTS

| | | | |
|---|---|---|---|
| 2004/0054774 A1* | 3/2004 | Barber et al. | 709/224 |
| 2004/0062273 A1* | 4/2004 | Frank et al. | 370/468 |
| 2006/0165103 A1* | 7/2006 | Trudeau et al. | 370/401 |
| 2006/0182073 A1 | 8/2006 | Pani et al. | |
| 2010/0189199 A1 | 7/2010 | Lou et al. | |
| 2010/0322141 A1* | 12/2010 | Liu et al. | 370/315 |
| 2011/0075613 A1* | 3/2011 | Yuan | 370/329 |
| 2011/0134866 A1* | 6/2011 | Frank et al. | 370/329 |
| 2011/0222486 A1 | 9/2011 | Hart | |
| 2011/0243020 A1 | 10/2011 | Ponnuswamy | |
| 2012/0147804 A1 | 6/2012 | Hedayat et al. | |
| 2012/0163331 A1 | 6/2012 | Chan et al. | |
| 2012/0224483 A1* | 9/2012 | Babiarz et al. | 370/232 |
| 2013/0010597 A1* | 1/2013 | Liu et al. | 370/235 |
| 2013/0201863 A1 | 8/2013 | Chan et al. | |

OTHER PUBLICATIONS

IEEE: IEEE P802.11n/D2.00 Draft Standard for Information Technology—Telecommunications and information exchange between systems—Local and metropolitan area networks—Specific requirements—Part 11: Wireless LAN Medium Access Control (MAC) and Physical Layer (PHY) specifications: Amendment: Enhancements for Higher Throughput Feb. 2007, pp. 199-202.

Devin Akin: "802.11n 20/40 MHz BSS Mode Rules" CWNP Wireless Certification and Wireless Training, Aug. 29, 2007.

Yu, et al., "An Adaptive Radio Resource Management Technique for APs in WLANs," IEEE International Conference on Networks (ICON'04), Nov. 2004, pp. 85-91.

* cited by examiner

| BSS WITH 11ac | PRIMARY | SECONDARY20 | SECONDARY40 | |
|---|---|---|---|---|
| BSS WITH 11n | NOT USED | NOT USED | PRIMARY | SECONDARY20 |

FIG.4

BOTH BSS
WITH 11ac

| PRIMARY | SECONDARY20 | SECONDARY40 |

| PRIMARY | SECONDARY20 | SECONDARY40 |

FIG.5

80 MHZ-USING CHANNELS 36-48

(P,S20,S40): {36, 40, 44, 48}-METRIC * BIAS = SCORE1
(P,S20,S40): {40, 36, 44, 48}-METRIC * BIAS = SCORE2
(P,S20,S40): {44, 48, 36, 40}-METRIC * BIAS = SCORE3
(P,S20,S40): {48, 44, 36, 40}-METRIC * BIAS = SCORE4
(P,S20): {36, 40}-METRIC * BIAS = SCORE5
(P,S20): {40, 36}-METRIC * BIAS = SCORE6
(P,S20): {44, 48}-METRIC * BIAS = SCORE7
(P,S20): {48, 44}-METRIC * BIAS = SCORE8

→ SELECT CHANNELIZATION THAT HAS THE BEST
SCORE AMONG SCORE1-SCORE8 FOR EACH AP

DYNAMIC BANDWIDTH SELECTION FOR WIDE BANDWIDTH WIRELESS LOCAL AREA NETWORKS

TECHNICAL FIELD

The present disclosure relates to wireless local area networks.

BACKGROUND

The Institute of Electrical and Electronics Engineers (IEEE) 802.11ac amendment to the IEEE 802.11 standard is the next-generation wireless local area network (WLAN) enhancement that is highly anticipated by the wireless industry. The 802.11ac amendment is designed to provide a significant increase in achievable data rates.

A new feature introduced by the IEEE 802.11ac amendment is operation in channel-widths of 80 MHz, 160 MHz and 80+80 MHz. These channels are significantly wider than the current 20 or 40 MHz wide channels of IEEE 802.11n. Consequently, dynamic channel assignment schemes need to handle and optimize to the new wider channelizations of IEEE 802.11ac, yet account for the coexistence with legacy devices that operate according to the 802.11n standard.

In addition, 802.11ac also allows an access point (AP) to switch from the wider channel-width modes to one of the existing narrower bandwidths, such as 20 MHz or 40 MHz. This is particularly useful for networks that have 802.11ac APs along with legacy APs and/or clients, which can only operate with the narrower bandwidths. While an AP should switch modes whenever it is more beneficial for performance, the exact conditions for doing so are not specified in the standard.

DESCRIPTION OF EXAMPLE EMBODIMENTS

Overview

Dynamic bandwidth selection techniques are provided for a plurality of wireless access point devices that operate in a wireless local area network. Each access point device is capable of serving wireless client devices with a bandwidth from a set of possible bandwidths associated with one or multiple contiguous or non-contiguous radio frequency (RF) channels. For each access point device, metrics are computed for a set of RF channels which are available for use, wherein the metrics are based on presence and severity of detected interference from non-wireless local area network devices and based on presence and severity of detected co-channel and adjacent channel interference. In addition, for each access point, at least one of the following is determined: type of traffic for wireless client devices served by the access point device, or client composition representing a number of wireless client devices which are capable of operating with a first bandwidth in the set of possible bandwidths and a number of wireless client devices which are capable of operating with a second bandwidth in the set of possible bandwidths, wherein the second bandwidth is greater than the first bandwidth. A bias is generated based on the determined type of traffic or client composition for each access point device, the bias favoring a channel assignment that results in a particular bandwidth in the set of bandwidths. The bias is applied to the metrics to generate adjusted metrics. A bandwidth from the set of possible bandwidths is selected for each access point device based on the adjusted metrics.

Example Embodiments

Techniques for Dynamic Bandwidth Selection (DBS) are provided that intelligently address switching between bandwidths in devices configured for the anticipated IEEE 802.11ac operations and new coexistence scenarios.

Dynamic Channel Assignment (DCA) involves finding an optimal channel assignment for all the APs based on steady-state conditions, such as neighboring AP distances, rogue channel configurations, AP types and overall radio frequency (RF) noise and interference levels at the AP's location. These slow-varying parameters are useful to determine a favorable wide bandwidth channel for a given AP for an extended time. Examples of DCA techniques are described in commonly assigned U.S. Pat. No. 8,155,482, commonly assigned and co-pending U.S. application Ser. No. 13/412,717, filed Mar. 2, 2012, and commonly assigned and co-pending U.S. application Ser. No. 13/584,881 filed Aug. 14, 2012. The entirety of each of these documents is incorporated herein by reference.

There are many short-term situations when the widest bandwidth of a channel does not provide optimal performance. As such, dynamic bandwidth selection techniques are presented herein that fine-tune the bandwidth to use within the assigned channel based on relatively more transient conditions. Dynamic bandwidth selection constantly monitors the channel and Basic Service Set (BSS) statistics (running at a shorter cycle than dynamic channel assignment) to dynamically react to changes by varying the channel-width, e.g., selecting between 40 MHz and 80 MHz bandwidths.

DBS and DCA can complement each other to find the best channel and bandwidth choice for each AP. In one example, DBS may apply an additional layer of bias values on top of those applied in DCA, such that the net result of the channel assignment would be by the DBS results.

Figure 1:
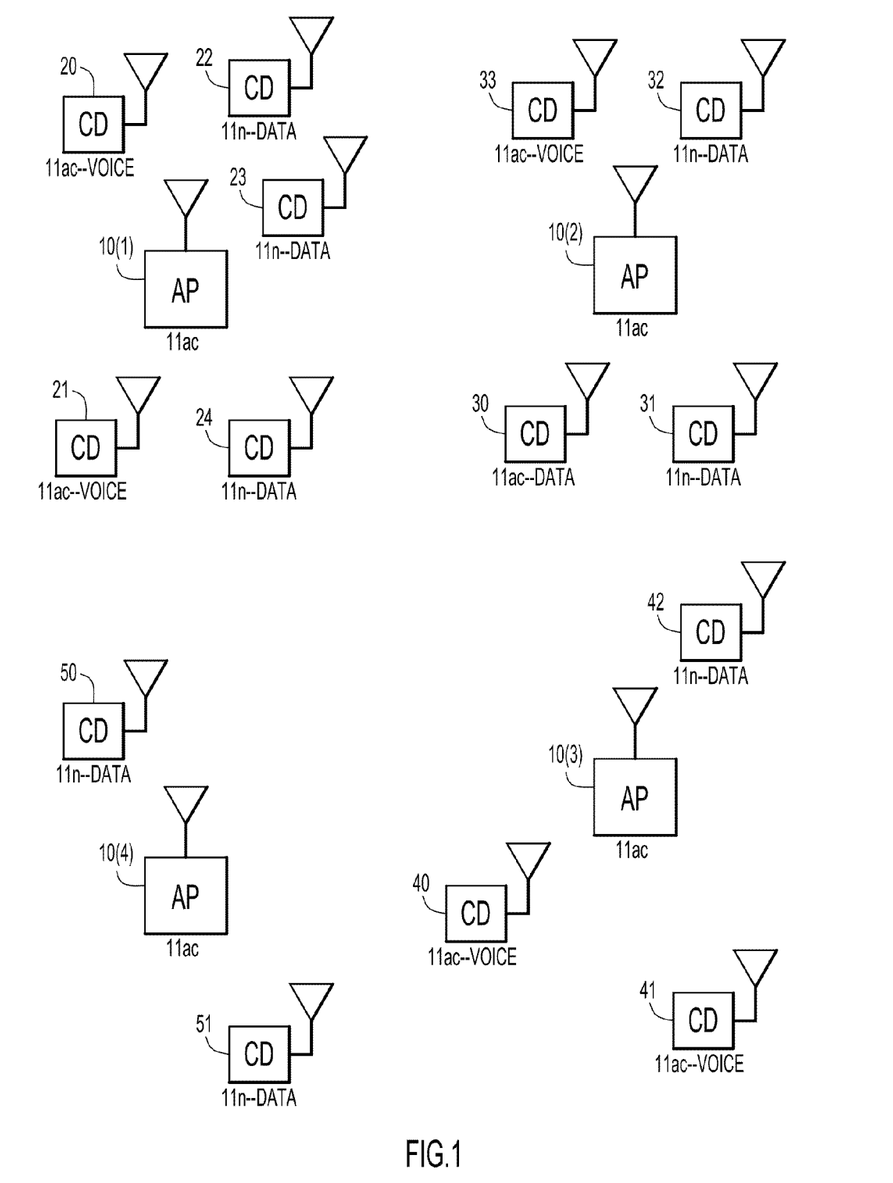
FIG. 1 is an example block diagram of wireless local area deployment comprising multiple access point devices configured to operate with different bandwidths (channel-widths) to serve different types of wireless client devices.

Reference is now made to FIG. 1 for a general description of a wireless local area network (WLAN) deployment for which the techniques described herein may be employed. FIG. 1 is meant only to be an example. In the example of FIG. 1, there are multiple WLAN access points (APs), e.g., four APs 10(1), 10(2), 10(3) and 10(4). Again, this is a simplified example of a typical enterprise WLAN deployment. APs 10(1)-10(3) are IEEE 802.11ac ("11ac") APs and AP 10(4) is an IEEE 802.11n ("11n") AP. Each AP operates in its own Basic Service Set (BSS) with respect to the client devices (CDs) that it serves.

AP 10(1) has five associated CDs 20-24, in which, at a given snapshot in time, CDs 20 and 21 are engaged in wireless voice (e.g., Voice-over-IP) activities and CDs 22-24 are engaged in wireless data (e.g., email or Internet browsing) activities. Furthermore, CDs 20 and 21 are 11ac clients and CDs 22-24 are 11n clients.

AP 10(2) has four associated CDs 30-33, where CDs 30 and 31 are 11ac clients and CDs 32 and 33 are 11n clients. Moreover, CDs 30-32 are engaged in wireless data activities and CD 33 is engaged in wireless voice activity.

AP 10(3) has three associated CDs 40-42. CDs 40 and 41 are 11ac clients and are engaged in wireless voice activities. CD 42 is an 11n client and is engaged in wireless data activity.

AP 10(4) has two associated 11n CDs, both engaged in wireless data activity.

When APs 10(1)-10(4) are operating in sufficient proximity to each other, the RF channel assignment to the APs can impact the operation of each other, particularly when the channel bandwidths can be wider in 11ac WLAN operations. The underlying concept of DBS is to switch APs to different bandwidth modes within an assigned channel when conditions favorable to a switch present.

Figure 2:
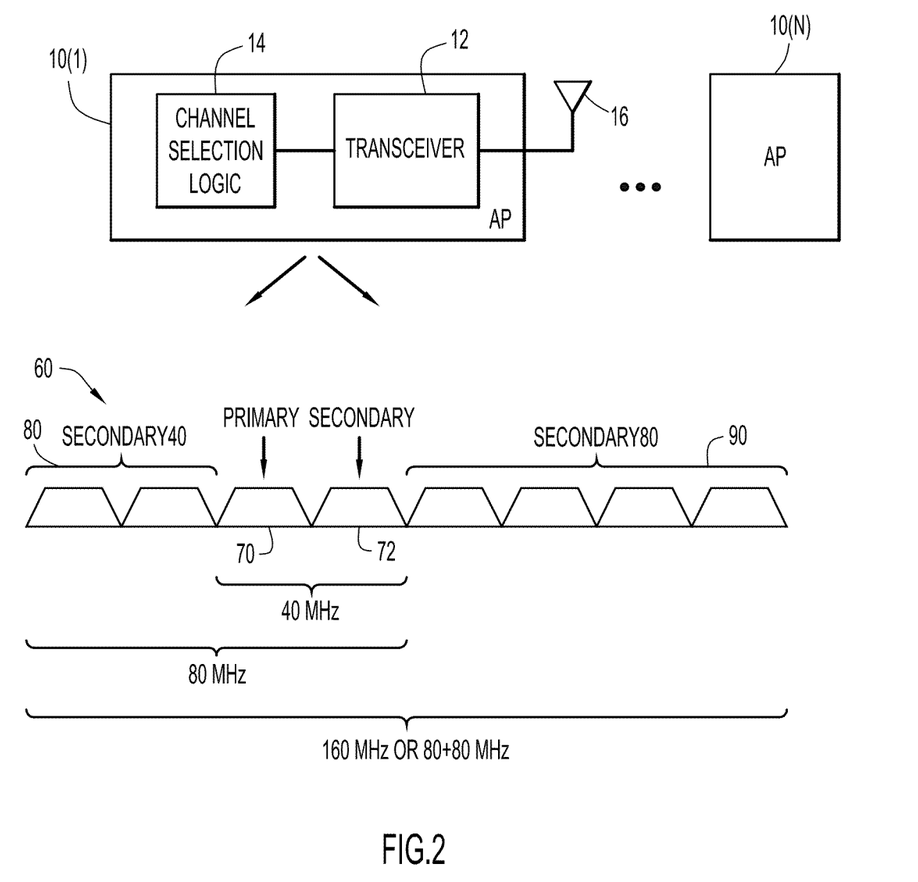
FIG. 2 is a diagram illustrating an example bandwidth that can be assigned among a plurality of access points for a deployment scenario such as that shown in FIG. 1.

Referring to FIG. 2, a diagram is shown of APs 10(1)-10(N), each comprising a transceiver 12 controlled by channel selection logic 14. The AP 10(1) transmits and receives radio frequency (RF) signals via antenna 16 on one or more RF channels under control of the channel selection logic 14.

FIG. 2 also shows a frequency spectrum 60 in which the APs 10(1)-10(N) may transmit RF signals to serve one or more CDs. The clients are not shown in FIG. 1, for simplicity.

The spectrum 60 is broken out to illustrate the various possibilities for channelization, accounting for the advanced channelization schemes of the IEEE 802.11ac amendment as well as IEEE 802.11n. A "primary channel" is a set of one or more RF channels that is a smaller denomination of RF channels that a device uses when it is not operating in a wider bandwidth mode. A "secondary channel" is one or more RF channels that a device uses in conjunction with a primary channel when it is operating in a wider bandwidth mode. For example, if a wider bandwidth mode is 160 MHz, then the primary channel may be a 20 MHz channel (P20), a 40 MHz channel (P40) and an 80 MHz primary channel (P80). Thus, there are multiple possible wider bandwidth modes, each with a different bandwidth: 40 MHz, 80 MHz and 160 MHz.

In one example, a single RF channel is 20 MHz. According to IEEE 802.11n, an RF channel may serve as a primary channel 70 and an adjacent second RF channel may serve as a secondary channel 72. According to IEEE 802.11n, an AP may aggregate primary channel 70 and secondary channel 72 to transmit in 40 MHz of bandwidth.

However, IEEE 802.11ac allocates two 20 MHz RF channels adjacent to the primary channel 70 for use as a 40 MHz secondary channel, called secondary 40, shown at reference numeral 80. In addition, 802.11ac allocates four 20 MHz RF channels adjacent to the secondary channel 72 for use as an 80 MHz secondary channel, called secondary 80, shown at reference numeral 90. Thus, further channelization options include a combination of the primary and secondary channels 70 and 72 with the secondary 40 channel 80, to achieve 80 MHz of bandwidth, and a combination of the primary and secondary channels 70 and 72 with the secondary 40 channel 80 and the secondary 80 channel 90 to achieve 160 MHz of contiguous bandwidth, or a non-contiguous 80+80 MHz mode that splits the 160 MHz channel into two.

Secondary channel 72 is an example of a "single RF channel secondary channel" in that it is comprised of a single RF channel. Secondary channels 80 and 90 are examples of a "multiple RF channel secondary channel" in that each comprises more than one RF channel. Secondary 40 channel 80 comprises two RF channels and secondary 80 channel 90 comprises four RF channels.

Depending on the proximity of various APs 10(1)-10(N) to each other and on the channels that they use, they may be overlapping BSSs (OBSS) in that they are operating on the same channels within sufficient proximity to each other that they could interfere with each other.

There are scenarios and conditions to be considered when evaluating whether to vary channel-width for a group of BSSs. The DBS techniques are initially described herein with respect to scenarios that use 40 and 80 MHz bandwidths, but they can be generalized to 20, 40, 80 and 160 MHz bandwidths as well.

40 MHz as Basic Bandwidth Unit

In one example, the lowest (basic) bandwidth denomination adapted with DBS is 40 MHz. This means the range of possible channel configurations will be from (1) all 80 MHz 11ac BSSs to (2) all 40 MHz 11ac (or 11n) BSSs. The selection is based on the criteria described below.

Sharing Secondary 40 Among 80 MHz OBSSs without Interference

Figure 3:
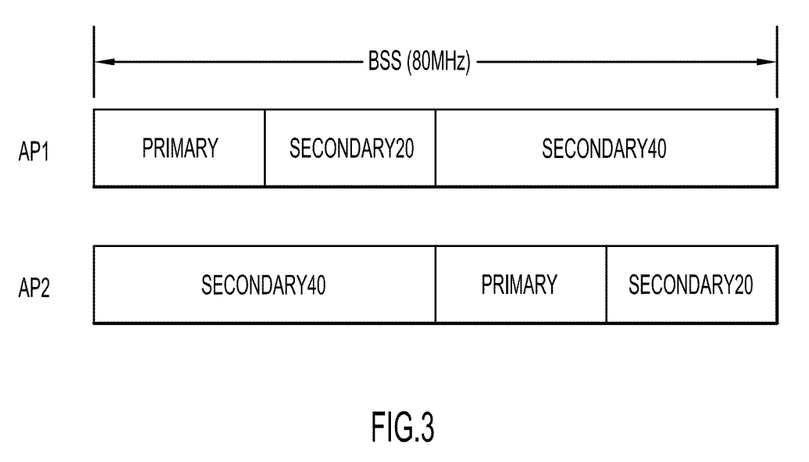
FIGS. 3-5 are diagrams showing example channelizations for bandwidth assignment scenarios.

FIG. 3 illustrates a channelization possible in 802.11ac that has the ability for 80 MHz OBSSs to transmit 40 MHz frames without interfering with each other. With this staggered placement, even when the secondary 40 channel is occupied by a transmission, an 80 MHz 11ac AP can select 40 MHz as the transmission bandwidth for the time being, so the overall network is still fully utilizing the entire channel. The selection of which half of the secondary 40 channel to place the primary channel is not the critical concern of DBS.

Selecting 40 MHz can be more efficient depending on the number of 40 MHz 11n clients in a BSS. Similarly, certain traffic flows in one BSS may not benefit from neighboring BSSs having wider bandwidths that impinge on the first BSS.

Figure 4:
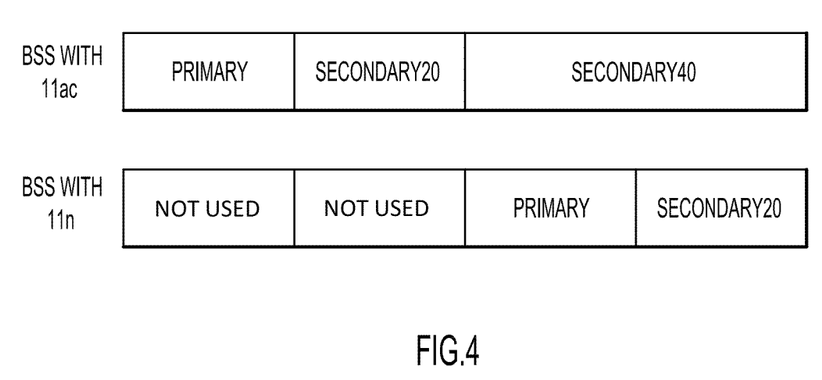

In order to steer a deployment into suitable bandwidth configurations, DBS may steer the channel allocations as follows:

(1) When client stations are all 11n or there are traffic flow types which work better with narrower bandwidths: the 80 MHz 11ac BSS is switched/changed to use 40 MHz channel-widths. This configuration is shown in FIG. 4.

(2) When there is a mix of 11n and 11ac client stations: the secondary 40 channel is shared between 80 MHz BSSs (i.e., the configuration illustrated in FIG. 3).

Figure 5:
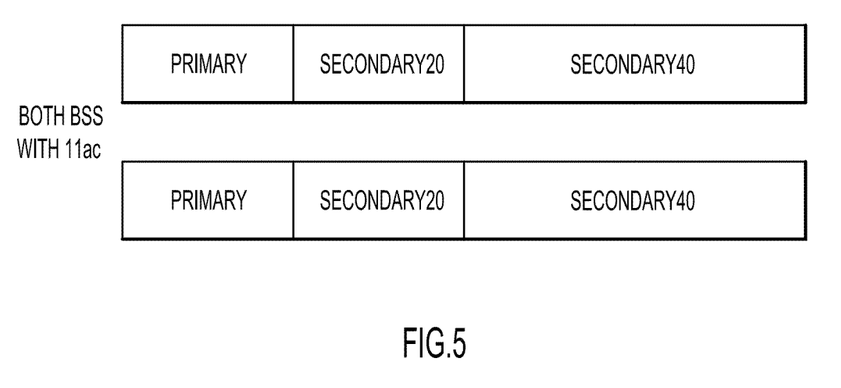

(3) Otherwise, the APs are kept at 80 MHz channels in a non-staggered manner (i.e., with their primary channels aligned, which may be the default configuration DCA will prescribe to each AP). This configuration is shown in FIG. 5.

Simulations have shown that these bandwidth allocations attain a higher throughput than others for their corresponding conditions.

If the clients in both BSSs are mostly 11ac, then each AP may still decide to use either 80 MHz or 40 MHz depending on the amount of overlap between the OBSSs. In an overlapping coverage region, if there are multiple 11ac clients from different BSSs communicating simultaneously, they could be served with either 80 MHz or 40 MHz. If the BSSs are non-overlapping, each BSS can obtain a peak of 80 MHz usage. Therefore, depending on the Clear Channel Assessment (CCA) state the BSS will either use 80 MHz or 40 MHz protocol data units.

These conditions can be "steered into" by applying appropriate biases to a channel configuration's RF cost metrics. Traffic-based bias can be incorporated as a function of the number of clients of each type and fractions of different types of traffic on a particular AP. These biases may be computed as follows.

DBS Cost Metric Bias Based on Client Composition

To compute the degree to which an AP should favor the staggered 80 MHz configuration (depicted in FIG. 3), a bias is computed that is based on the client composition for an AP (BSS). In one example, this client composition based bias is tied to a ratio of the number of 11ac clients to the number of 11n clients that an AP is currently serving. For example, the bias is computed as:

$$T_{dbs} = C*10*\log 10(\text{Number of }11ac\text{ Clients/Number of }11n\text{ Clients}),$$

where C is a constant whose value is adjusted to tune the algorithm's sensitivity in reacting to a certain scenario.

This bias is added to all channelization instances that are candidates for an AP to choose from. $T_{dbs}$ is a large negative value when the number of 11n clients is significantly more than the number of 11ac clients. Conversely, $T_{dbs}$ is a large positive value when the number of 11ac clients is much greater than the number of 11n clients. If numbers of the two types of clients are nearly equal, then $T_{dbs}$ is close to zero.

To be practical, this bias is capped from −10 to +10 dB. For example, let $T_s=4$ and $C=1$. There are three possibilities:

(a) When $+10 \geq T_{dbs} > +T_s$, then the DBS algorithm will favor choosing the non-staggered 80 MHz channelization for the AP (as shown in FIG. 5);

(b) When $+T_s \geq T_{dbs} \geq -T_s$, then the DBS algorithm will favor choosing the staggered 80 MHz channelization for the AP (as shown in FIG. 3);

(c) When $-T_s = -4 > T_{dbs} \geq -10$, then the DBS algorithm will favor switching this AP to a 40 MHz channel.

Moreover, a smoothing operation may be performed between the current number of clients and the previous number when DBS was last run.

DBS Cost Metric Bias Based on Voice Traffic

It has been determined that performance of voice applications do not improve when employing wider bandwidths. Therefore, when the system observes a significant number of clients sending voice traffic in the WLAN, 40 MHz channelizations should be favored. To do so, a bias is introduced that is based on the number of clients engaged in wireless voice activity. An example of such a bias is defined as:

$$V = \{0, -y, -2y, \ldots, -\text{MAX\_VOICE\_BIAS}\}.$$

In this example, the bias V is added to channelization instances that are candidates to choose from for an AP, such that a 40 MHz channelization will be favored the more negative V is and vice versa. The specific bias value is selected as a function of the percentage of voice clients. For example, if 0% of clients are engaged in voice activity, then V=0; if X % of clients are engaged in voice activity, then V=−y, if 2×% of clients are engaged in voice activity then V=−2y, etc. Many wireless network controllers have access to statistical data concerning the types of wireless applications that clients are engaged in for the various APs under control of the wireless network controller. Parameters X, y and MAX_VOICE_BIAS can be determined depending on a desired inclination and sensitivity towards optimizing a deployment for voice traffic.

Described above are two different ways to map the ratio of 11ac clients to 11n clients for purposes of assigning a bias. It is also possible that the same type of bias computation is used for both voice clients and the client composition. For example, the bias scheme used for voice clients could also be used for client composition.

The DCA algorithm would assign channels such that they are spread across APs in a deployment. As a result, an AP and its closest neighboring APs are unlikely to be OBSSs on the same 80 MHz channel. Thus, OBSSs are more likely to be located at some distance away from each other and the clients at the edge of respective OBSSs will likely not interfere with each other. When the system observes client patterns of this type for two OBSSs under consideration (e.g., that the number of those clients at the edge is above a certain threshold), then there may not be a compelling need to place the channels in the staggered configuration for those APs.

Cost Metric Calculation for Each Bandwidth

Figure 6:
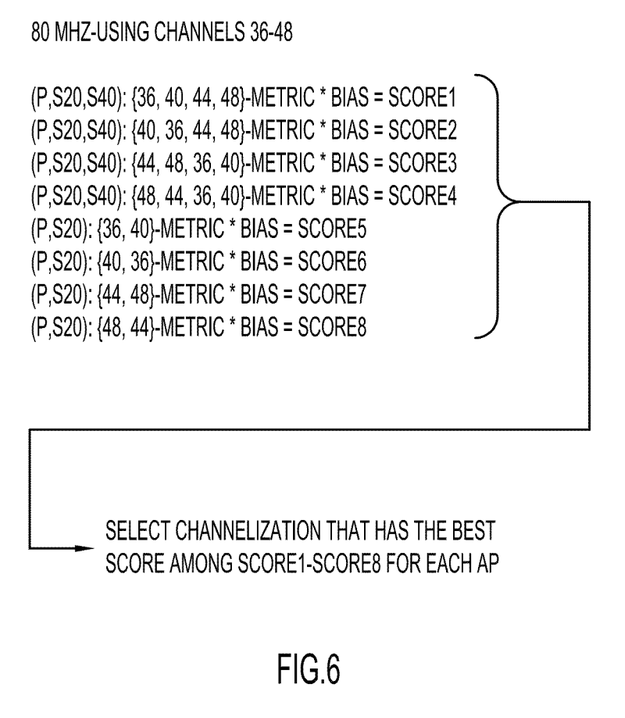
FIG. 6 shows example channelizations, each of which having a bias that is applied to their associated cost metric for purposes of selecting the best channelization for an access point.

The DBS mechanism may be deployed as part of the DCA algorithm, in the sense that cost metrics are maintained for each channelization for all bandwidths. To illustrate this, consider an 80 MHz embodiment that uses channels 36 to 48, for which all the alignment possibilities are listed in FIG. 6. In FIG. 6, P, S20 and S40 respectively denote primary, secondary 20 and secondary 40, respectively. A cost metric is associated with each of channelization possibilities.

The cost metric for each channelization possibility is first calculated by the DCA algorithm such that the considerations of steady state conditions in the RF environment are accounted for. Then, the DBS related biases to favor or disfavor certain channelizations are applied, where a lower cost metric represents the more desired (better) channel and bandwidth selection. Finally, according to this rule, the best channelization is chosen for each AP based on the scores for all of the possible channelizations.

Cost of Changing Channels

Since changing the primary channel actually means changing the BSS's channel, it is disruptive for clients each time DBS issues a change. A hysteresis can be applied such that DBS does not issue a bandwidth selection change unless the improvement in the cost metric for a new channelization is above that hysteresis. For example, a bias of 5/15/30 dB respectively for High/Medium/Low sensitivity is added to the cost metric against changing to a new channelization.

Algorithm Periodicity

As mentioned above, the cycle period to run DBS is intended to be shorter than that of DCA. The DBS iterations may be run at a sub-multiple of the DCA update interval. For example, if DCA is run every hour, then dynamic bandwidth selection can be run at every 20 minutes. Moreover, metrics are computed, as between each AP and all of its neighboring APs, metrics for each of a plurality of RF channel assignment possibilities for the set of bandwidths, and the bias is generated for each RF channel assignment possibility for the set of bandwidths. The bias is applied to metrics for each corresponding RF channel assignment possibility to generate adjusted metrics for each RF channel assignment possibility, and the selection of a bandwidth is made among the RF channel assignment possibilities based on the adjusted metrics.

Generalization

The dynamic bandwidth selection techniques presented herein refer to embodiments that employ a 40 MHz basic unit on 80 MHz channels. This may be generalized to other bandwidths and multiple numbers of basic units. Such generalizations could cover selection of a bandwidth from one of the following sets, for example:

{20 MHz, 40 MHz, 80 MHz} on 80 MHz channels.
{20 MHz, 40 MHz, 80 MHz, 160/80+80 MHz} on 160/80+80 MHz channels.

{40 MHz, 80 MHz, 160/80+80 MHz} on 160/80+80 MHz channels.

{80 MHz, 160/80+80 MHz} on 160/80+80 MHz channels.

In summary, techniques are presented herein for a wireless network controller to select the best bandwidth suitable for the managed APs belonging to the same WLAN network. An 11ac-capable AP is assigned a bandwidth from the set {40 MHz, 80 MHz} depending on (a) the type of clients associated with it, (b) the type of traffic the clients are running, (c) the presence of interference on whole or portions of the bandwidth, and (d) level of interference the AP receives from co-channel and adjacent-channel of managed/unmanaged/rogue APs. These dynamic bandwidth techniques may be generalized to cover a larger set of allowable bandwidth.

Figure 7:
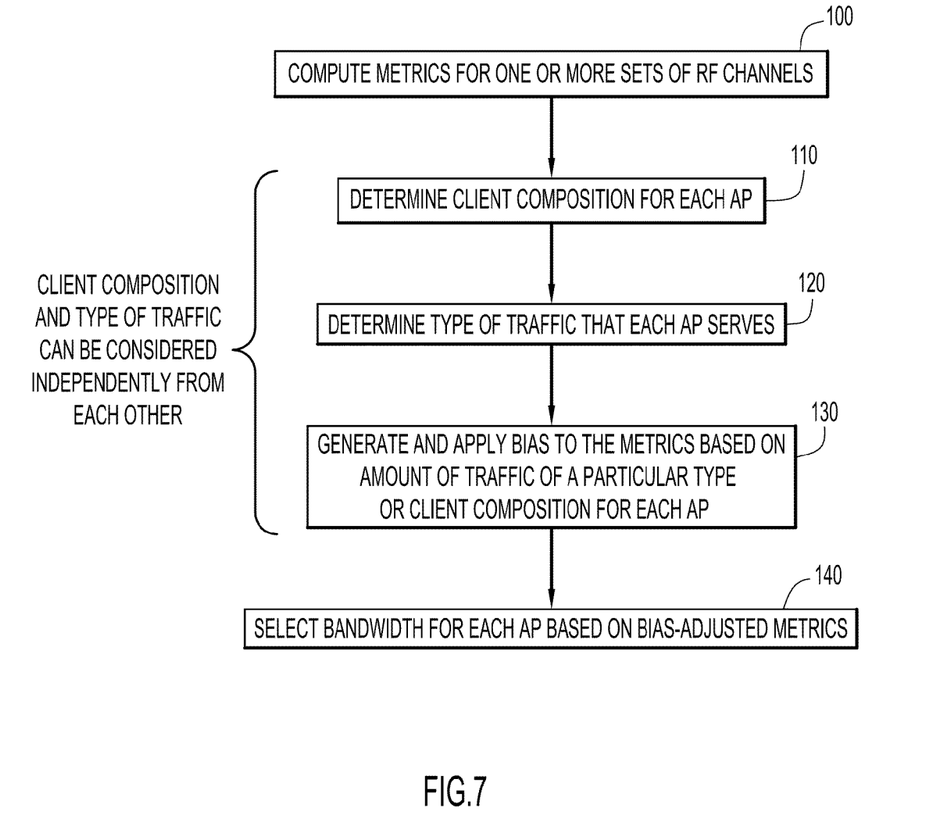
FIG. 7 is a flow chart depicting operations performed to assign bandwidths to access points in accordance with the techniques presented herein.

Turning now to FIG. 7, an example flow chart is now described for operations of the dynamic bandwidth selection procedure. At 100, cost metrics are computed for one or more sets of RF channels from which channel assignment (and bandwidth selection may be made). These are the metrics that are used for dynamic channel assignment, and from which a bandwidth may be selected from a set of possible bandwidths associated with one or multiple contiguous or non-contiguous RF channels. The different AP and client bandwidth capabilities and channelization schemes, as should be understood by the description herein, applies to, for example, 20 MHz vs. 40 MHz vs. 80 MHz vs. 160 MHz vs. 80+80 MHz scenarios. For each access point device, metrics are computed for a set of RF channels, where the metrics are based in part on one or both of presence and severity of detected interference from non-wireless local area network devices and based on presence and severity of detected co-channel and adjacent channel interference.

The cost metrics may be calculated from a variety of RF measurements that would affect a channel's quality for wider bandwidth operation mode. Examples of RF measurements include:

1. The ambient noise floor in dBm.
2. Receive signal strength information (RSSI) strengths in dBm and average traffic loads of RF signals from known overlapping BSSs.
3. RSSI strengths in dBm and average traffic load of RF signals that the device under consideration would contribute to a candidate set of channels.
4. RSSI strengths in dBm and average duty cycles of unidentified RF signals detected in a candidate set of channels.
5. All of the foregoing measurements on nearby channels but attenuated appropriately based on their separations in frequency from each other.

At 110, the client composition for each AP is determined. The client composition represents or indicates a number of client devices which are capable of operating with a first bandwidth (e.g., 11n clients) in the set of possible bandwidths and a number of wireless client devices which are capable of operating with a second bandwidth (e.g., 11ac clients) in the set of possible bandwidths, wherein the second bandwidth is greater than the first bandwidth. As explained above, the client composition may be computed as a ratio between the number of wireless client devices that are capable of operating with the first bandwidth and the number of wireless client devices that are capable of operating with the second bandwidth.

At 120, the type of traffic used by client devices (e.g., used by a majority of client devices) served by each access point is determined. For example, the amount of voice traffic each access point is handling for the client devices it is currently serving is determined. More generally, the type of traffic may be traffic of any particular application type that is more efficiently served by the access point device with a different (e.g., narrower) bandwidth for wireless client devices. Voice is one example of a particular application type because of its relatively short packet size. However, this can be applied, beyond voice, to any application type that uses relatively short packets, e.g., "sensory" type traffic or machine-to-machine (M2M) traffic.

At 130, a bias is generated based on the client composition or type of traffic, and the bias is applied to the cost metrics (computed at 100) for each access point (for each possible channelization scenario). There may be some situations in which only the client composition is considered when generating the bias, other situations when only type of traffic is considered, and still other situations when both client composition and type of traffic are considered when generating the bias. Thus, client composition and type of traffic may be considered independently or together.

As explained above, a client composition ratio between the number of wireless client devices that are capable of operating with the first bandwidth (11n clients) and the number of wireless client devices that are capable of operating with the second bandwidth (11ac clients) is computed. The bias computed at 130 may be dependent on where the client composition ratio computed for an access point is with respect to a plurality of ratio ranges or one or more thresholds. In one example, as depicted in FIG. 3, for first and second overlapping access points, the bias is generated to favor selection of a staggered RF channel alignment in which the primary channel and single RF channel secondary channel of the first access point device are aligned with a multiple RF channel secondary channel of the second access point device, and the primary channel and single RF channel secondary channel of the second access point device are aligned with the multiple RF channel secondary channel of the first access point device. As explained above, a primary channel is a set of one or more RF channels that is a smaller denomination of RF channels used by an access point device when it is operating with the first bandwidth and a secondary channel is one or more RF channels used in conjunction with a primary channel when an access point device is operating with the second bandwidth. An example of a single RF channel secondary channel is a secondary 20 channel, and an example of a multiple RF channel secondary channel is a secondary 40 channel or a secondary 80 channel. When it is determined that the first and second access point devices are located sufficiently distant from each other such that wireless client devices for the respective first and second access point devices do not interfere with each other, the bias may be generated to favor selection of an RF channel alignment other than the staggered RF channel alignment for the first and second access points.

In another example scenario, the bias is generated to favor selection of an RF channel alignment in which the primary channel and a multiple RF channel secondary channel of the first access point device are aligned with a multiple RF channel secondary channel of the second access point device, and the primary channel and multiple RF channel secondary channel of the second access point device are aligned with the multiple RF channel secondary channel of the first access point device. This addresses the case of, for example, two 160 MHz APs or two 80+80 APs, an 80 MHz AP and a 160 MHz AP, or a 40 MHz AP and either an 80 MHz or a 160 MHz AP.

In yet another example, as depicted in FIG. 5, when the client composition ratios for the first and second access point devices are within a first ratio range, the bias is generated to favor selection of a non-staggered RF channel alignment for the first and second access point devices in which the primary channel and single RF channel secondary channel of the first access point device are aligned with the primary channel and the single RF channel secondary channel of the first access point device, and the multiple RF channel secondary channel of the first access point device is aligned with the multiple RF channel secondary channel of the second access point device.

In still another example, when the client composition ratio for one of the first and second access point devices is within a second ratio range, the bias is generated to favor selection of a relatively smaller bandwidth among the set of possible bandwidths.

Furthermore, as explained above, the type of traffic that is determined may be an amount of traffic of a particular application type (e.g., voice traffic) served by the access point for its associated client devices, and the bias is computed at 130 to favor (or disfavor) selection of a bandwidth depending on the amount of traffic of the particular application type served by the access point. For example, the bias is generated to favor selection of a relatively smaller bandwidth among the set of possible bandwidths in proportion to the amount of traffic of the particular application type (e.g., voice) served by the access point device.

In any case, the bias is computed to favor (or disfavor) channel assignment that results in a particular bandwidth in the set of bandwidths based on client composition and/or type of traffic. Also at 130, the bias is applied to the cost metrics (computed or obtained at 100) to generate adjusted metrics.

At 140, bandwidth selection for each access point is made based on the bias-adjusted metrics (herein also referred to simply as "adjusted metrics") derived at 130.

The cost metrics at 100 are derived from detecting presence and severity degree of any interference from non-wireless local area network devices in any RF channel in the set of possible bandwidths, and the bandwidth is selected (at 140) based on any detected interference. Moreover, presence and severity degree of any co-channel and adjacent channel interference each access point device experiences from other access point devices that are part of the plurality of access point devices as well as access point devices not part of the plurality of access point devices (e.g., unmanaged or rogue access points) is determined, and bandwidth selection (at 140) is based further on any detected co-channel and adjacent channel interference.

As depicted in FIG. 6 and explained above, the metrics are computed, at 100, for each of a plurality of RF channel assignment possibilities (i.e., RF channelizations) for the set of bandwidths, and the bias is generated for each RF channel assignment possibility for the set of bandwidths. The bias is applied for each corresponding RF channel assignment possibility to generate bias-adjusted (adjusted) metrics for each RF channel assignment possibility. The bandwidth is selected among the RF channel assignment possibilities based on the bias-adjusted metrics.

In summary, FIG. 7 depicts a method performed for a WLAN including a plurality of wireless access point devices each capable of serving wireless client devices with a bandwidth from a set of possible bandwidths based on the bandwidth associated with one or multiple contiguous or non-contiguous RF channels. For each access point device, metrics are computed for a set of RF channels which are available for use, wherein the metrics are based on presence and severity of detected interference from non-wireless local area network devices and based on presence and severity of detected co-channel and adjacent channel interference. In addition, for each access point, at least one of the following is determined: type of traffic for wireless client devices served by the access point device, or client composition representing a number of wireless client devices which are capable of operating with a first bandwidth in the set of possible bandwidths and a number of wireless client devices which are capable of operating with a second bandwidth in the set of possible bandwidths, wherein the second bandwidth is greater than the first bandwidth. A bias is generated based on the determined type of traffic or client composition for each access point device, the bias favoring a channel assignment that results in a particular bandwidth in the set of bandwidths. The bias is applied to the metrics to generate bias-adjusted metrics. A bandwidth from the set of possible bandwidths is selected for each access point device based on the bias-adjusted metrics. These determining, generating the bias, applying the bias and selecting operations may be performed repeatedly over time, either periodically or on-demand.

Figure 8:
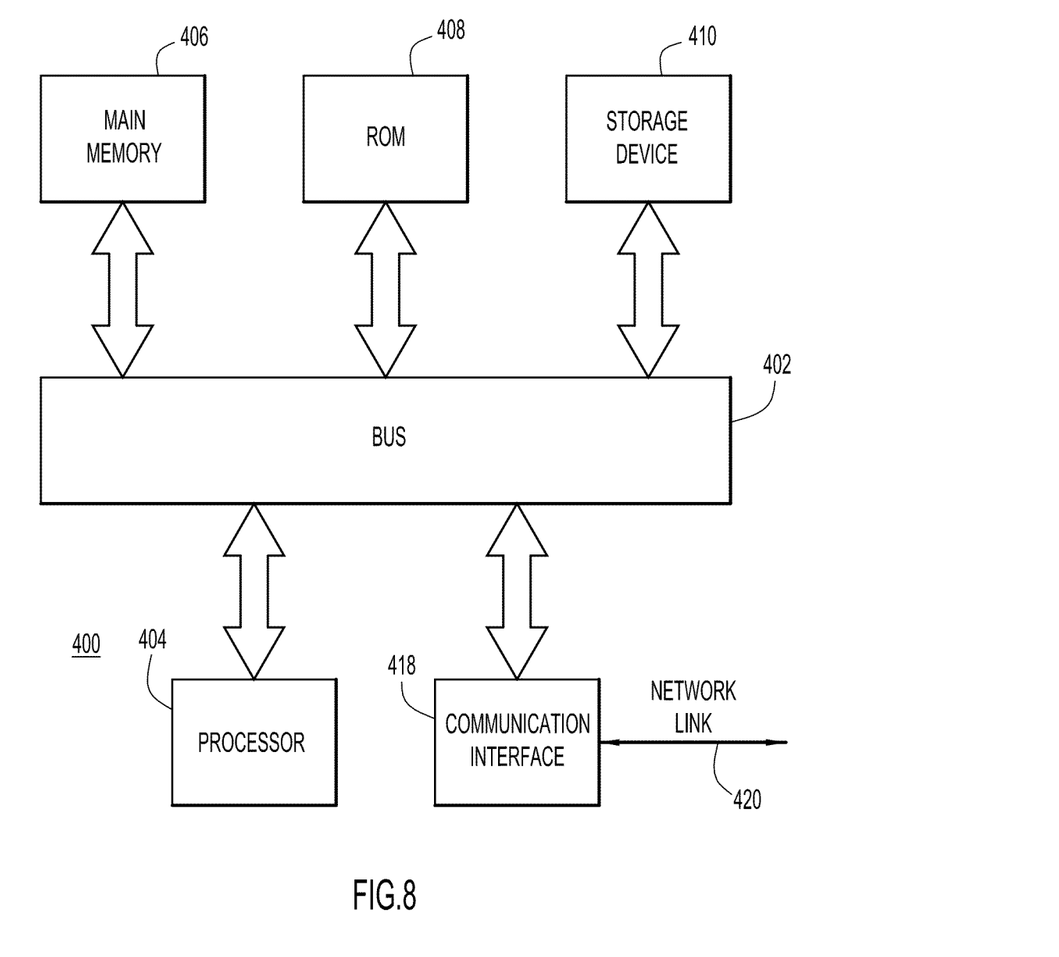
FIG. 8 is an example block diagram of an apparatus in which the bias computations described herein may be made.

FIG. 8 is block diagram of a computer system 400 upon which an example embodiment can be implemented, and which may be used to make the computations and bandwidth selection decisions described herein. Computer system 400 includes a bus 402 or other communication mechanism for communicating information and a processor 404 coupled with bus 402 for processing information. Computer system 400 also includes a main memory 406, such as random access memory (RAM) or other dynamic storage device coupled to bus 402 for storing information and instructions to be executed by processor 404. Processor 404 may be a microprocessor or microcontroller, for example. Main memory 406 also may be used for storing a temporary variable or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

An aspect of the example embodiment is related to the use of computer system 400 for selecting a bandwidth among a set of bandwidths. According to an example embodiment, the processor 404 executes one or more sequences of one or more instructions contained in main memory 406 in order to perform the operations of the channel selection logic 14 (FIG. 1) as described above in connection with FIGS. 1-7. Such instructions may be read into main memory 406 from another computer-readable storage medium, such as storage device 410. Execution of the sequence of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry (e.g., fixed digital logic gates) may be used in place of or in combination with software instructions to implement an example embodiment. Thus, embodiments described herein are not limited to any specific combination of hardware circuitry and software.

The term "computer-readable medium" as used herein refers to any physical device medium that participates in providing instructions to processor 404 for execution. Such a medium may take many forms, including but not limited to non-volatile media, volatile media. Non-volatile media include for example optical or magnetic disks, such as storage device 410. Volatile media include dynamic memory such as main memory 406. Transmission media include coaxial cables, copper wire and fiber optics, including the wires that comprise bus 402. Common forms of (non-transitory) computer-readable media include for example floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Various forms of computer-readable media may be involved in carrying one or more sequences of one or more instructions to processor 404 for execution. For example, the instructions may initially be borne on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406 from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a network, such as a WLAN or LAN. For example, communication interface 418 may be a wireless transceiver or a network card such as an Ethernet card, in other embodiments communication interface 418 may be a modem to provide a data communication connection to a corresponding type of telephone line. In any such implementation, communication interface 418 sends and receives electrical, electromagnetic, or optical signals that carry digital data streams representing various types of information.

Computer system 400 can send messages and receive data, including program codes, through communication interface 418. In accordance with an example embodiment, one such downloaded application provides for selecting channels as described herein. The received code may be executed by processor 404 as it is received, and/or stored in storage device 410, or other non-volatile storage for later execution.

Figure 9:
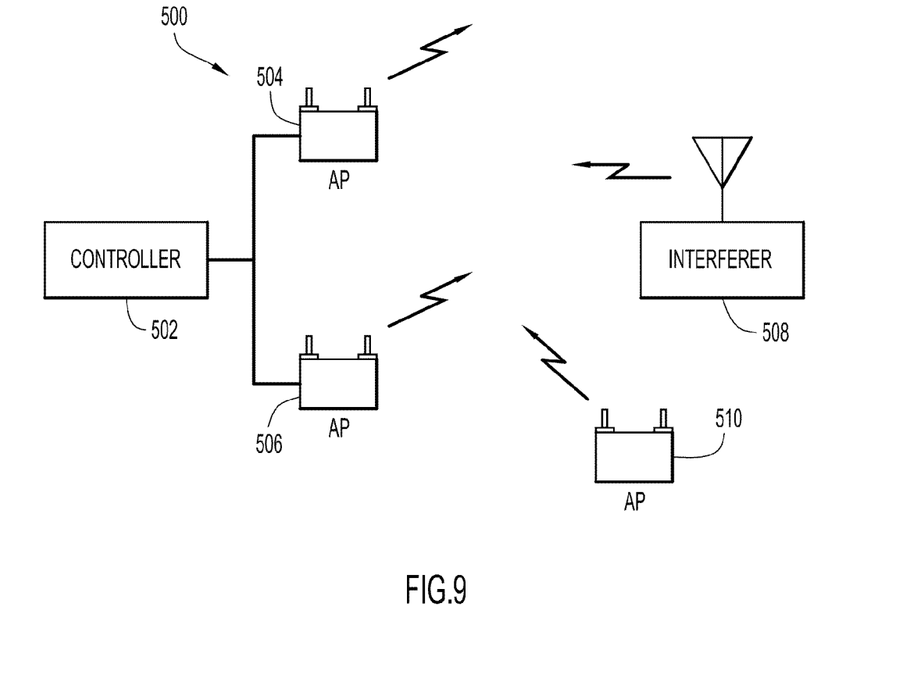
FIG. 9 is an example block diagram of wireless network environment in which the bandwidth assignment techniques may be used.

FIG. 9 illustrates an example wireless network 500 upon which an example embodiment may be implemented. Network 500 comprises a management device ("management entity") or wireless network controller 502, in data communication with APs 504, 506. The communication link between controller 502 and APs 504, 506 may be suitably a wired, wireless and/or any combination of wired and wireless links. In an example embodiment, controller 502 acquires data from APs 504, 506 about available channels, such as other APs detected, for example AP 510 which may be a rogue AP or an AP operating on a different network. APs 504, 506 may also acquire RSSI data about interfering sources or noise, such as for example from interferer 508. Such data about interfering sources or noise may suitably comprise data indicating which channels are affected and/or the intensity of the interference. Based on this data, controller 502 can select bandwidths for APs 504, 506. In particular embodiments, controller 502 also assigns the channels to achieve the desired bandwidths using the rules or methods described herein in connection with FIGS. 1-7.

In one example, APs 504, 506 may initially select and align operating channels, and resulting bandwidth. Once operational, controller 502 may verify the selected channels, channel alignment and bandwidths. Controller 502 may subsequently select new channels, new channel alignments and/or bandwidths for one or more of APs 504, 506. Controller 502 communicates the new channels, alignments and/or bandwidths to AP 504 and/or 506 which are responsive to change to the new channels and/or alignment.

The dynamic bandwidth selection techniques allow for more robust allocation of spectrum resources. As the WLAN industry gradually moves from legacy 11a/11n devices to wider bandwidth 11ac devices, there is a need for techniques that can optimize the network for a variety of devices with varying bandwidth. The dynamic bandwidth selection techniques presented herein optimize the bandwidth of the managed APs by incorporating most/all channel bandwidth options and selecting the optimum bandwidth based on various inputs.

Due to the unlicensed nature of the spectrum used by 802.11 devices, there is always a possibility of rogue APs or other types of interference. The dynamic bandwidth selection techniques add another tool to deal with these situations by either narrowing the bandwidth or shifting operation to the other channels. Moreover, the dynamic bandwidth selection techniques consider inputs such as density of 802.11n (narrower bandwidth devices) versus 802.11ac (wider bandwidth) devices, etc., to optimize bandwidth selection and allocation.

Described above are examples. The concepts described herein may be embodied in other specific forms without departing from the spirit or essential characteristics thereof. The foregoing examples are therefore to be considered in all respects illustrative and not meant to be limiting. Accordingly, it is intended to embrace all such alterations, modifications and variations that fall within the spirit and scope of any claims filed in applications claiming priority hereto interpreted in accordance with the breadth to which they are fairly, legally and equitably entitled.

What is claimed is:

1. A method comprising:
in a wireless local area network including a plurality of wireless access point devices each capable of serving wireless client devices with a bandwidth from a set of possible bandwidths associated with one or multiple contiguous or non-contiguous radio frequency (RF) channels for each access point device, wherein a primary channel is a set of one or more RF channels that is a smaller denomination of RF channels used by an access point device when it is operating with the first bandwidth and a secondary channel is one or more RF channels used in conjunction with a primary channel when an access point device is operating with the second bandwidth, computing metrics for a set of RF channels which are available for use, wherein the metrics are based in part on one or both of presence and severity of detected interference from non-wireless local area network devices and based on presence and severity of detected co-channel and adjacent channel interference;
determining at least one of: type of traffic for wireless client devices served by the access point device, or a client composition ratio of a number of wireless client devices which are capable of operating with a first bandwidth in the set of possible bandwidths and a number of wireless client devices which are capable of operating with a second bandwidth in the set of possible bandwidths, wherein the second bandwidth is greater than the first bandwidth; and
generating a bias to favor channel assignment that results in a particular bandwidth in the set of bandwidths based on the determining;
applying the bias to the metrics to produce adjusted metrics; and selecting, based on the adjusted metrics, a bandwidth from the set of possible bandwidths for each access point device, wherein the generating includes generating the bias based on client composition ratios computed for overlapping first and second access point devices so as to favor selection of a staggered RF channel alignment in which the primary channel and single RF channel secondary channel of the first access point device are aligned with a multiple RF channel secondary channel of the second access point device, and the primary channel and single RF channel secondary channel of the second access point device are aligned with the multiple RF channel secondary channel of the first access point device.

2. The method of claim 1, wherein determining comprises determining both the type of traffic for wireless client devices served by each access point device, and the client composition for each access point device.

3. The method of claim 1, wherein determining, generating, applying and selecting are performed repeatedly over time.

4. The method of claim 1, wherein when it is determined that the first and second access point devices are located sufficiently distant from each other such that wireless client devices for the respective first and second access point devices do not interfere with each other, generating the bias comprises generating the bias to favor selection of an RF channel alignment other than the staggered RF channel alignment for the first and second access points.

5. The method of claim 1, wherein generating the bias comprises generating the bias depending on the client composition ratio computed for an access point device with respect to a plurality of ranges or one or more thresholds.

6. The method of claim 5, wherein when the client composition ratios for the first and second access point devices are within a first ratio range, generating the bias comprises generating the bias to favor selection of a non-staggered RF channel alignment for the first and second access point devices in which the primary channel and single RF channel secondary channel of the first access point device are aligned with the primary channel and the single RF channel secondary channel of the first access point device, and the multiple RF channel secondary channel of the first access point device is aligned with the multiple RF channel secondary channel of the second access point device.

7. The method of claim 5, wherein when the client composition ratio for one of the first and second access point devices is within a second ratio range, generating the bias comprises generating the bias to favor selection of a relatively smaller bandwidth among the set of possible bandwidths.

8. The method of claim 1, wherein determining the type of traffic for wireless client devices served by the access point device comprises determining an amount of traffic of a particular application type that is served by the access point device for wireless client devices, and wherein generating the bias comprises generating the bias to favor selection of a bandwidth depending on the amount of traffic of the particular application type served by the access point device.

9. The method of claim 8, wherein generating the bias comprises generating the bias to favor selection of a relatively smaller bandwidth among the set of possible bandwidths in proportion to the amount of traffic of the particular application type served by the access point device, wherein the particular application type is voice.

10. The method of claim 1, wherein computing metrics comprises computing, as between each access point device and all of its neighboring access point devices, metrics for each of a plurality of RF channel assignment possibilities for the set of bandwidths, and generating comprises generating the bias for each RF channel assignment possibility for the set of bandwidths and applying comprises applying the bias to metrics for each corresponding RF channel assignment possibility to generate adjusted metrics for each RF channel assignment possibility, and wherein selecting comprises selecting among the RF channel assignment possibilities based on the adjusted metrics.

11. A method comprising:
   in a wireless local area network including a plurality of wireless access point devices each capable of serving wireless client devices with a bandwidth from a set of possible bandwidths associated with one or multiple contiguous or non-contiguous radio frequency (RF) channels for each access point device computing metrics for a set of RF channels which are available for use, wherein the metrics are based in part on one or both of presence and severity of detected interference from non-wireless local area network devices and based on presence and severity of detected co-channel and adjacent channel interference;
   determining at least one of: type of traffic for wireless client devices served by the access point device, or a client composition ratio of a number of wireless client devices which are capable of operating with a first bandwidth in the set of possible bandwidths and a number of wireless client devices which are capable of operating with a second bandwidth in the set of possible bandwidths, wherein the second bandwidth is greater than the first bandwidth; and
   generating a bias to favor channel assignment that results in a particular bandwidth in the set of bandwidths based on the determining;
   applying the bias to the metrics to produce adjusted metrics; and
   selecting, based on the adjusted metrics, a bandwidth from the set of possible bandwidths for each access point device, wherein a primary channel is a set of one or more RF channels that is a smaller denomination of RF channels used by an access point device when it is operating with the first bandwidth and a secondary channel is one or more RF channels used in conjunction with a primary channel when an access point device is operating with the second bandwidth, and based on the client composition ratios computed for overlapping first and second access point devices, generating comprises generating the bias to favor selection of an RF channel alignment in which the primary channel and a multiple RF channel secondary channel of the first access point device are aligned with a multiple RF channel secondary channel of the second access point device, and the primary channel and multiple RF channel secondary channel of the second access point device are aligned with the multiple RF channel secondary channel of the first access point device.

12. The method of claim 11, wherein determining the type of traffic for wireless client devices served by each access point device comprises determining an amount of traffic of a particular application type that is served by the access point device for wireless client devices, and wherein generating the bias comprises generating the bias to favor selection of a bandwidth depending on the amount of traffic of the particular application type served by each access point device.

13. The method of claim 12, wherein generating the bias comprises generating the bias to favor selection of a relatively smaller bandwidth among the set of possible bandwidths in proportion to the amount of traffic of the particular application type served by the access point device, wherein the particular application type is voice.

14. The method of claim 11, wherein computing metrics comprises computing, as between each access point device and all of its neighboring access point devices, metrics for each of a plurality of RF channel assignment possibilities for the set of bandwidths, and generating comprises generating the bias for each RF channel assignment possibility for the set of bandwidths and applying comprises applying the bias to metrics for each corresponding RF channel assignment possibility to generate adjusted metrics for each RF channel assignment possibility, and wherein selecting comprises selecting among the RF channel assignment possibilities based on the adjusted metrics.

15. One or more non-transitory computer readable storage media encoded with software comprising computer executable instructions and when the software is executed operable to:
 for a wireless local area network including a plurality of wireless access point devices each capable of serving wireless client devices with a bandwidth from a set of possible bandwidths associated with one or multiple contiguous or non-contiguous radio frequency (RF) channels, for each access point device, compute metrics for a set of RF channels which are available for use, wherein the metrics are based on presence and severity of detected interference from non-wireless local area network devices and based on presence and severity of detected co-channel and adjacent channel interference;
 determine at least one of: type of traffic for wireless client devices served by the access point device, or a client composition ratio of a number of wireless client devices which are capable of operating with a first bandwidth in the set of possible bandwidths and a number of wireless client devices which are capable of operating with a second bandwidth in the set of possible bandwidths, wherein the second bandwidth is greater than the first bandwidth; and
 generate a bias depending on the client composition ratio computed for an access point device with respect to a plurality of ranges or one or more thresholds so as to favor channel assignment that results in a particular bandwidth in the set of bandwidths based on the determining;
 apply the bias to the metrics to produce adjusted metrics; and
 select, based on the adjusted metrics, a bandwidth from the set of possible bandwidths for each access point device.

16. The computer readable storage media of claim 15, wherein the instructions operable to determine the type of traffic comprises instructions operable to determine an amount of traffic of a particular application type that is served by the access point device for wireless client devices, and to generate the bias to favor selection of a bandwidth depending on the amount of traffic of the particular application type served by the access point device.

17. The non-transitory computer readable storage media of claim 15, wherein a primary channel is a set of one or more RF channels that is a smaller denomination of RF channels used by an access point device when it is operating with the first bandwidth and a secondary channel is one or more RF channels used in conjunction with a primary channel when an access point device is operating with the second bandwidth, and based on the client composition ratios computed for overlapping first and second access point devices, the instructions operable to generate the bias comprise instructions operable to generate the bias to favor selection of a staggered RF channel alignment in which the primary channel and single RF channel secondary channel of the first access point device are aligned with a multiple RF channel secondary channel of the second access point device, and the primary channel and single RF channel secondary channel of the second access point device are aligned with the multiple RF channel secondary channel of the first access point device.

18. The non-transitory computer readable media of claim 17, further comprising instructions operable to: determine whether the first and second access point devices are located sufficiently distant from each other such that wireless client devices for the respective first and second access point devices do not interfere with each other; and when it is determined that the first and second access point devices are located sufficiently distant from each other such that wireless client devices for the respective first and second access point devices do not interfere with each other, generate the bias to favor selection of an RF channel alignment other than the staggered RF channel alignment for the first and second access points.

19. The non-transitory computer readable media of claim 17, further comprising instructions operable to: when the client composition ratios for the first and second access point devices are within a first ratio range, generate the bias to favor selection of a non-staggered RF channel alignment for the first and second access point devices in which the primary channel and single RF channel secondary channel of the first access point device are aligned with the primary channel and the single RF channel secondary channel of the first access point device, and the multiple RF channel secondary channel of the first access point device is aligned with the multiple RF channel secondary channel of the second access point device.

20. An apparatus comprising:
 a network interface unit configured to enable communications over a network to communicate with a plurality of wireless access points in a wireless local area network, each wireless access point device capable of serving wireless client devices with a bandwidth from a set of possible bandwidths associated with one or multiple contiguous or non-contiguous multiple radio frequency (RF) channels;
 a processor coupled to the network interface unit, wherein the processor is configured to:
  compute metrics for a set of RF channels which are available for use, wherein the metrics are based on presence and severity of detected interference from non-wireless local area network devices and based on presence and severity of detected co-channel and adjacent channel interference;
  determine at least one of: type of traffic for wireless client devices served by the access point device, or a client composition ratio of a number of wireless client devices which are capable of operating with a first bandwidth in the set of possible bandwidths and a number of wireless client devices which are capable of operating with a second bandwidth in the set of possible bandwidths, wherein the second bandwidth is greater than the first bandwidth; and
  generate a bias depending on the client composition ratio computed for an access point device with respect to a plurality of ranges or one or more thresholds so as to favor channel assignment that results in a particular bandwidth in the set of bandwidths based on the determining;
  apply the bias to the metrics to produce adjusted metrics; and select, based on the adjusted metrics, a bandwidth from the set of possible bandwidths for each access point device.

21. The apparatus of claim 20, wherein the processor is configured to determine an amount of traffic of a particular application type that is served by the access point device for wireless client devices, and to generate the bias to favor selection of a bandwidth depending on the amount of traffic of the particular application type served by the access point device.

22. The apparatus of claim 20, wherein a primary channel is a set of one or more RF channels that is a smaller denomination of RF channels used by an access point device when it is operating with the first bandwidth and a secondary channel is one or more RF channels used in conjunction with a primary channel when an access point device is operating with the second bandwidth, and wherein based on the client composition ratios computed for overlapping first and second access point devices, the processor is configured to generate the bias to favor selection of a staggered RF channel alignment in which the primary channel and single RF channel secondary channel of the first access point device are aligned with a multiple RF channel secondary channel of the second access point device, and the primary channel and single RF channel secondary channel of the second access point device are aligned with the multiple RF channel secondary channel of the first access point device.

23. The apparatus of claim 22, wherein the processor further determines whether the first and second access point devices are located sufficiently distant from each other such that wireless client devices for the respective first and second access point devices do not interfere with each other; and when it is determined that the first and second access point devices are located sufficiently distant from each other such that wireless client devices for the respective first and second access point devices do not interfere with each other, the processor further generates the bias to favor selection of an RF channel alignment other than the staggered RF channel alignment for the first and second access points.

24. The apparatus of claim 22, wherein when the client composition ratios for the first and second access point devices are within a first ratio range, the processor generates the bias to favor selection of a non-staggered RF channel alignment for the first and second access point devices in which the primary channel and single RF channel secondary channel of the first access point device are aligned with the primary channel and the single RF channel secondary channel of the first access point device, and the multiple RF channel secondary channel of the first access point device is aligned with the multiple RF channel secondary channel of the second access point device.

* * * * *